United States Patent
Liu

(10) Patent No.: US 11,290,208 B1
(45) Date of Patent: Mar. 29, 2022

(54) DECODING IMPLEMENTATION METHOD OF BLUETOOTH RECEIVER

(71) Applicant: NANJING QINHENG MICROELECTRONICS CO., LTD., Nanjing (CN)

(72) Inventor: Deliang Liu, Nanjing (CN)

(73) Assignee: NANJING QINHENG MICROELECTRONICS CO., LTD., Nanjing (CN)

( * ) Notice: Subject to any disclaimer, the term of this patent is extended or adjusted under 35 U.S.C. 154(b) by 0 days.

(21) Appl. No.: 17/452,215

(22) Filed: Oct. 25, 2021

(51) Int. Cl.
*H04L 1/00* (2006.01)

(52) U.S. Cl.
CPC ................................ *H04L 1/0045* (2013.01)

(58) Field of Classification Search
None
See application file for complete search history.

(56) References Cited

U.S. PATENT DOCUMENTS 10,742,460 B2   8/2020   Murrin et al.

FOREIGN PATENT DOCUMENTS

| CN | 1671058 A | 9/2005 |
| CN | 11099528 A | 4/2020 |
| CN | 111162873 A | 5/2020 |

*Primary Examiner* — Hong Shao
(74) *Attorney, Agent, or Firm* — CBM Patent Consulting, LLC

(57) ABSTRACT

A decoding implementation method of a Bluetooth receiver includes: setting a first length threshold and a second length threshold; decoding and backtracking a first FEC block, and outputting a coded indicator and an access address of the first FEC block; determining whether a second FEC block needs despreading according to the coded indicator; matching the access address with an actual address, storing a survivor-path of the second FEC block in a SMU, decoding and backtracking the data stored in the SMU, outputting bit information, and taking out a length of a packet payload in a packet header from a time; and judging whether a total number of bits of the second FEC block exceeds the second length threshold according to the length of the packet payload to complete decoding.

9 Claims, 2 Drawing Sheets

DECODING IMPLEMENTATION METHOD OF BLUETOOTH RECEIVER

CROSS REFERENCES

This application claims the priority of Chinese patent application No. 202011255688.X filed before the Chinese Patent Office on Nov. 11, 2020, the entire contents of which are incorporated in this application by reference.

TECHNICAL FIELD

The present application relates to the field of low-power-consumption Bluetooth design technologies, and relates to a decoding implementation method of a Bluetooth receiver.

BACKGROUND

To meet the needs of long-distance transmission, convolutional codes (2,1,4) are added in Bluetooth 5.0 to convolutionally encode packet information, so that a receiving end can correct wrong bits in the transmission process. Viterbi decoding method is a frequently-used decoding method in a Bluetooth receiver, but in the Bluetooth receiver, the existing Viterbi decoding adopts one backtracking method from the beginning to the end. However, a packet format of Bluetooth 5.0 in a coded mode has its own special format, and a chip rate is only 1 M chip per-second. Therefore, for a special format of a received signal of the Bluetooth receiver, it is necessary to design the decoding process and the backtracking method according to these characteristics, instead of adopting one backtracking method from the beginning to the end, so as to meet the decoding requirements under low-power-consumption condition.

SUMMARY

The present application provides a decoding implementation method of a Bluetooth receiver, which solves the problems of high power consumption and low decoding efficiency of viterbi decoding in the Bluetooth receiver in the related art.

A decoding implementation method of a Bluetooth receiver includes:
setting a first length threshold and a second length threshold, wherein a received signal of the Bluetooth receiver includes a first Forward Error Correction (FEC) block and a second FEC block, the second FEC block includes a packet data unit and check data, the packet data unit includes a packet header, and the first length threshold is a sum of a length of the packet header and a length of the check data;
storing a survivor-path of the first FEC block in a Survivor-path Memory Unit (SMU), decoding and backtracking the first FEC block, and sequentially outputting a coded indicator and an access address of the first FEC block in a First Input First Output (FIFO) mode;
determining whether the second FEC block needs despreading according to the coded indicator, if the second FEC block needs despreading, despreading the second FEC block and waiting for decoding the despread second FEC block, and if the second FEC block does not need despreading, waiting for decoding the second FEC block; matching the access address with an actual address, if the access address is successfully matched with the actual address, waiting for decoding the second FEC block, and if the access address is not successfully matched with the actual address, resetting the Bluetooth receiver;
storing a survivor-path of the second FEC block into the SMU, when a data length stored in the SMU reaches the first length threshold, decoding and backtracking the data stored in the SMU, outputting bit information obtained by decoding and backtracking in a FIFO mode, and taking out a length of a packet payload in the packet header from a time when a time value is the same as the length value of the check data; and
judging whether a total number of bits of the second FEC block exceeds the second length threshold according to the length of the packet payload, and in response to that the total number of bits of the second FEC block does not exceed the second length threshold, performing one-time backtracking on the second FEC block to complete decoding; and in response to that the total number of bits of the second FEC block exceeds the second length threshold, performing block-by-block decoding and backtracking on the second FEC block, outputting a decoded stream with a fixed number of bits in each time, and in the case that a number of remaining bits after the block-by-block decoding does not exceed the second length threshold, performing one-time backtracking on the remaining bits to complete decoding.

In an implementation, the SMU includes B memory blocks, B≥3, and the memory block is configured to store survivor-paths.

In an implementation, the performing block-by-block decoding and backtracking on the second FEC block first includes:
storing the survivor-path of the second FEC block in a first memory block and a second memory block of the SMU, backtracking the second FEC block after memory spaces of the first memory block and the second memory block are both filled, and storing a new survivor-path of the second FEC block in a third memory block of the SMU when backtracking the second FEC block; and
in the case that the backtracking of the second FEC block enters the first memory block through the second memory block, outputting all bit information obtained in the backtracking of the first memory block as a decipher; after a memory space of the third memory block is filled, setting the second memory block and the third memory block as backtracking the second FEC block, setting the first memory block as storing the new survivor-path of the second FEC block, and circularly performing the following operations: after the memory spaces of the current two memory blocks of the SMU sequentially storing the survivor-path of the second FEC block are both filled, backtracking the second FEC block, storing the new survivor-path of the second FEC block in the remaining one memory block of the SMU, and in the case that the backtracking of the second FEC block enters the previous memory block through the latter memory block of the current two memory blocks storing the survivor-path, outputting all bit information obtained in the backtracking of the previous memory block as a decipher, and after the memory space of the remaining one memory block is filled, setting the latter memory block and the remaining one memory block as backtracking the second FEC block, and setting the previous memory block as storing the new survivor-path of the second FEC block.

In an implementation, a storage length of each memory block in the SMU is set as N, a total storage length of the SMU is set as B*N, and the second length threshold is set as the total storage length of the SMU.

In an implementation, when performing block-by-block decoding and backtracking on the second FEC block, a decoded result is outputted in a Last Input First Output (LIFO) mode.

In an implementation, the sequentially outputting the coded indicator and the access address of the first FEC block includes:

storing the survivor-path of the first FEC block into the SMU, when the stored data length of the SMU reaches a coded input bit length a of the first FEC block, decoding and backtracking the first FEC block, outputting the bit information obtained by decoding and backtracking by a FIFO mode, outputting the coded indicator from a backtracking time a2, and outputting the access address from a backtracking time a1+a2, wherein a1 is a length value of the coded indicator and a2 is a length value of a register null indicator included in the first FEC block.

In an implementation, the taking out the length of the packet payload in the packet header from the time when the time value is the same as the length value of the check data includes:

storing the survivor-path of the second FEC block into the SMU, when the data length stored in the SMU reaches b1+b2, backtracking and decoding the second FEC block, outputting the bit information obtained by decoding and backtracking in a FIFO mode, taking out a length field of the packet payload in the packet header from a backtracking time b2, and determining the length of the packet payload, wherein b1 is a length value of the packet header, and b2 is a length value of the check data.

In an implementation, when performing one-time backtracking on the second FEC block to complete decoding in response to that the total number of bits of the second FEC block does not exceed the second length threshold, a decoded result is output from a backtracking time b3, wherein b3 is a length value of a register null indicator included in the second FEC block.

In an implementation, each memory block in the SMU is a memory matrix of 8*N, a total storage length of the SMU is B*N bits, and a width of the SMU is 8 bits.

DETAILED DESCRIPTION

The present application is described below with reference to the accompanying drawings and the specific embodiments.

A Viterbi decoder usually consists of a Branch Metric Generate (BMG) unit, an Add Compare Select (ACS) unit, a PathMetricUnit (PMU), a SMU, a TraceBack-Unit (TBU) and a Control block. The functions of the above units or blocks are as follows:

1) The BMG unit is responsible for calculating a branch-metric value of jumping from a state at the current moment to a state at next moment.
2) The ACS unit receives the calculated branchmetric value from the BMG and adds the branchmetric value to a path accumulated value stored in the PMU at the previous moment to obtain metric values of two input paths. After comparison, selected survivor-paths and selected survivor-path metric values are stored in SMU and PMU paths respectively.
3) When a required moment is reached, a path with the smallest path metric value is selected from the survivor-paths. The TBU backtracks the path to generate a decipher and output the decipher.
4) The Control block controls actions of the plurality of units above.

Figure 1:
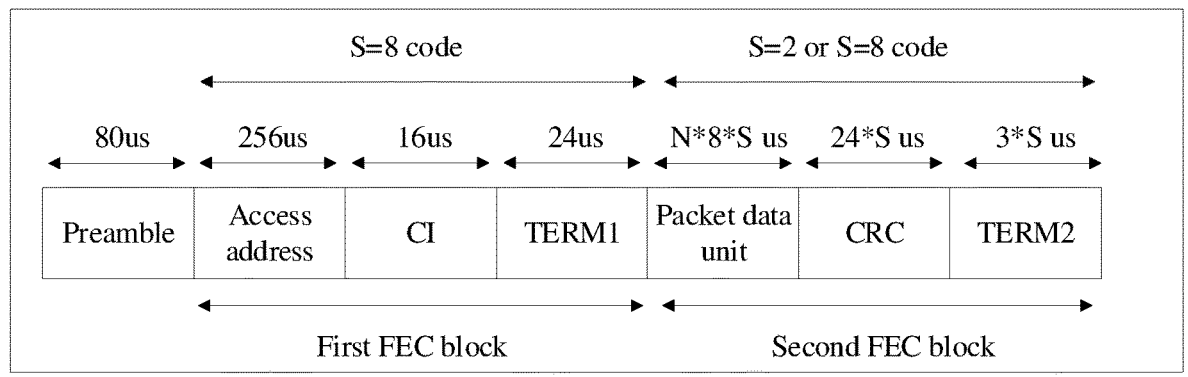
FIG. 1 is a packet format of Bluetooth 5.0 in a coded Physical layer (PHY) mode.

FIG. 1 is a packet format of Bluetooth 5.0 in coded PHYsical layer (PHY) mode. Each Bluetooth data includes such three blocks as a preamble (Preamble), a first FEC block (FEC block 1) and a second FEC block (FEC block 2). The preamble does not participate in coding and decoding. The first FEC block includes three fields: access address (Access Address), CodedIndicator (CI) and register null indicator (TERM1). The first FEC block uses a coding scheme of S=8, and S is a spreading factor. The second FEC block includes three fields: a Packet Data Unit (PDU), Cyclic Redundancy Check (CRC) data and a register null indicator (TERM2). The second FEC block uses a coding scheme of S=2 or S=8. When S=8, information bit needs to be expanded with 0011 (corresponding to bit 0) or 1100 (corresponding to bit 1), and then convolutional code is performed. When S=2, convolutional code is directly performed. The CI determines the coding scheme of the second FEC block. When CI=00, a spreading factor S of the second FEC block is equal to 8; and when CI=01, the spreading factor S of the second FEC block is equal to 2. Information bits corresponding to TERM1 and TERM2 are both 000, which are used to reset a status register to zero when coding. The PDU contains a 16-bit packet header and a packet payload of multiple bytes (0 to 255). The packet header indicates a byte number of the payload part.

A coded input bit length of the first FEC block in the packet format of Bluetooth 5.0 in a coded PHY mode is 37, wherein CI has two bits (00 or 01) and the register null indicator is 000. A length of a packet header in a packet data unit of the second FEC block is 16 bits, a length of a packet payload is b4, a length of check data is 24 bits, and the register null indicator is 000.

Figure 2:
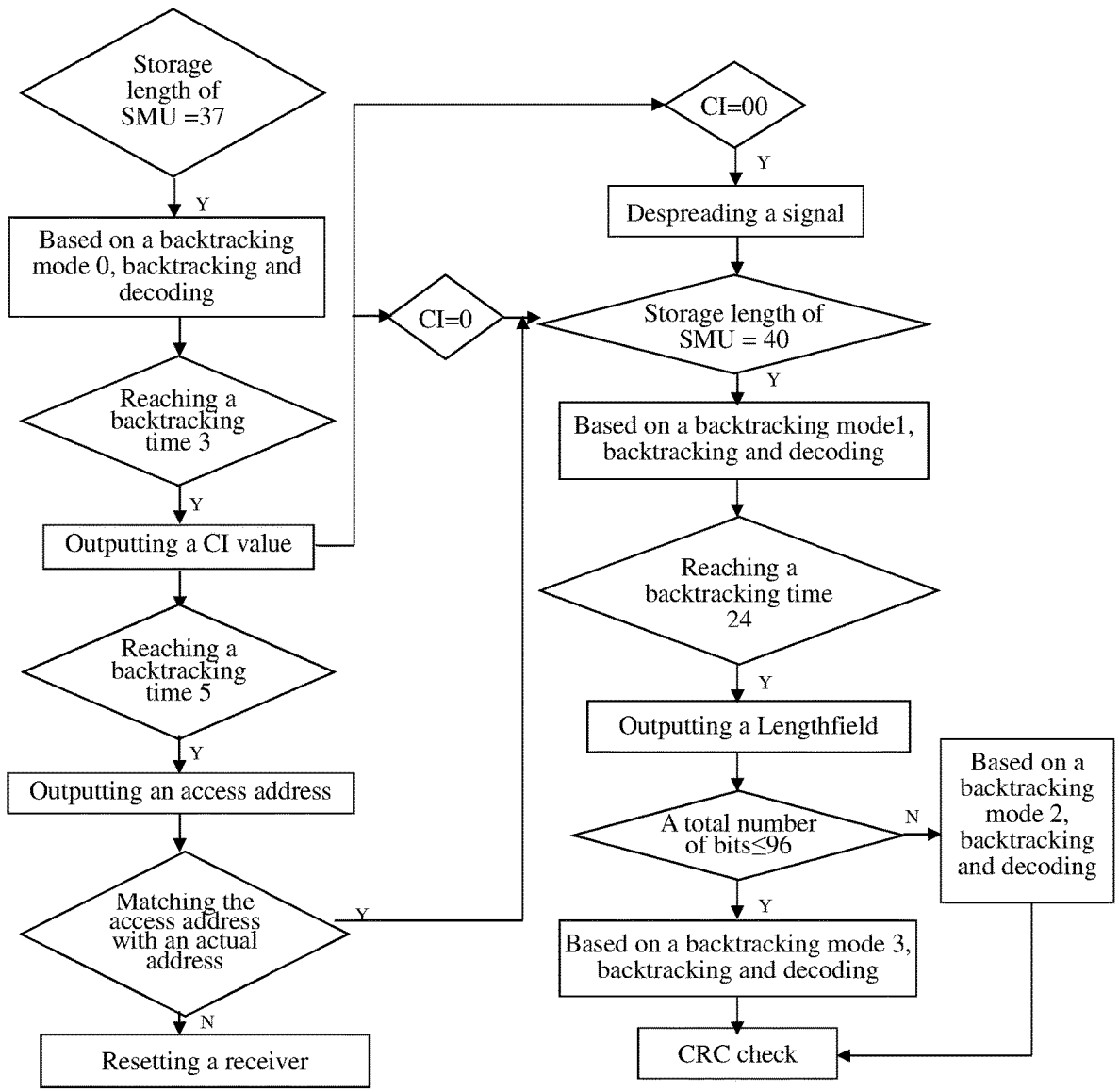
FIG. 2 is a flowchart of a low-power-consumption viterbi decoding implementation method of a Bluetooth receiver provided by an embodiment of the present application.

According to this data packet format, this embodiment proposes to decode the first FEC block and the second FEC block respectively. From the point of view of reducing power consumption, block-by-block backtracking is adopted for decoding. The SMU is divided into B memory blocks, which are set as storing survivor-paths, wherein B≥3, and each memory block is a memory matrix of 8*N. A total storage length of the SMU is B*N bits, and a width of the SMU is 8 bits. 8 bits exactly correspond to 8 states of convolutional codes (2,1,4). In this embodiment, taking B=3 and N=32 as examples, values of B and N can be flexibly determined according to the task requirements in practice. As shown in FIG. 2, a low-power-consumption viterbi decoding implementation method of the Bluetooth receiver includes the following steps.

A first length threshold and a second length threshold are set, wherein the first length threshold is a sum of the length of the packet header and the length of the check data in the second FEC block, i.e., 40. The second length threshold is 96 (3*32).

1. The First FEC Block is Decoded.

A survivor-path of the first FEC block is stored in the SMU. A coded input bit length of the first FEC block is 37, and TERM1 is used to make a coder state return to zero. Therefore, a decoding and backtracking length is 37, backtracking starts from 000 state, and bit information obtained from a backtracking time 0 will be used for output. A FIFO mode (decoded bits obtained first in one-time backtracking are output first) or a LIFO mode (decoded bits obtained last in one-time backtracking are output first) may be used for output of the TBU. But for the first FEC block, a FIFO mode needs to be employed. This is because that the decoding of the second FEC block needs the support of CI information. If CI is 00, the second FEC block needs to despread and then convolution decoding is carried out; and if CI is 01, convolution decoding is directly performed on the second FEC block. If the LIFO mode is employed in backtracking output, the CI information can only be obtained after the access address is output, and the waiting time of the second FEC block is too long, which is not beneficial for the decoder to input at a constant speed. A decoding end signal is output after decoding the first FEC block to reset the decoder and indicate that the second FEC block may be decoded. The backtracking mode here is defined as backtracking mode 0. In this mode, backtracking starts from the 000 state, and the bit information obtained from the backtracking time 0 will be used for output, and the FIFO mode is employed for output. Two-bit CI is output from a backtracking time 3, and the access address is continuously output from a backtracking time 5.

After the CI is output, it can be determined whether the second FEC block needs despreading according to the CI. If CI=00, the second FEC block needs despreading, then the second FEC block k is despreaded; and if CI=01, the second FEC block does not need despreading, and waits for decoding.

After the access address is output, the access address is matched with an actual address. If the access address is successfully matched with the actual address, the second FEC block is waiting for decoding. If the access address is not successfully matched with the actual address, the Bluetooth receiver is reset.

2. The second FEC block is decoded. This step is divided into two parts including first-stage decoding and second-stage decoding of the second FEC block. The first-stage decoding is used to obtain the length of the packet payload. The actual length of the payload is 0 bytes to 255 bytes, which is indicated by a Length field in the packet header in the PDU. This is because that the length of the packet payload needs to be determined first. If the length of the packet payload is not determined first and the length of the packet payload is very short, the decoder will run to a wrong moment beyond Bluetooth data. When the length of the payload is zero, the coded input bit length of the second FEC block is 40 bits (16-bit packet header plus 24-bit CRC, excluding TERM2), so the first length threshold is set to be 40. When the storage length of the SMU reaches 40, the first-stage decoding of the second FEC block is performed. The second-stage decoding refers to decoding and backtracking the second FEC block and outputting a normal decoded bit stream in the case that whether the total number of bits of the second FEC block exceeds the storage length of the SMU is determined, including the followings.

1) First-stage decoding: the survivor-path of the second FEC block is stored in the SMU, and when the data length stored in the SMU reaches 40, the data stored in the SMU is decoded and backtracked, the backtracking mode here is defined as backtracking mode 1, in which backtracking starts from the path with the smallest path metric value, and the bit information obtained from the backtracking time time 0 is used for output, which is output in a FIFO mode, and the length of the packet payload is taken out from a backtracking time 24 to a backtracking time 31 to guide a subsequent decoding operation. At the backtracking time 31, an indicator signal is sent, indicating that the first-stage decoding of decodeing the second FEC block is finished. In order to ensure the correctness and coherence of decoding as much as possible, the 40-bit survivor-path information stored in the SMU is still used for subsequent decoding.

2) Second-stage decoding: According to the length of the packet payload, whether the total number of bits of the second FEC block exceeds the total storage length (96) of the SMU is judged, and different decoding and backtracking methods are selected according to the result whether the total number of bits of the second FEC block exceeds 96. If the total number of bits of the second FEC block does not exceed 96, one-time backtracking is performed on the second FEC block to complete decoding. If the total number of bits of the second FEC block exceeds the second length threshold, block-by-block decoding and backtracking are performed on the second FEC block first until the number of decoded remaining bits does not exceed 96, and then one-time decoding and backtracking are performed on the remaining bits for output. In the normal block-by-block decoding backtracking operation, the number of decoded bits output in each time is fixed (B bits), and a LIFO mode is employed for output. This backtracking mode is defined as backtracking mode 2. When the total number of bits of the second FEC block or the remaining number of bits after repeated block-by-block decoding and backtracking does not exceed 96, a one-time decoding and backtracking operation is performed. In this operation, the backtracking starts from the 000 state, and the bit information obtained from the backtracking time 3 is used for output, and a LIFO mode is employed for output. The backtracking mode in this operation is defined as a backtracking mode 3. In general viterbi decoding, there are usually two backtracking modes, namely, block-by-block backtracking and bit-by-bit backtracking. In this method, block-by-block backtracking is adopted. The block-by-block decoding and backtracking and the bit-by-bit decoding and backtracking are explained below.

A coded stream output rate of Bluetooth 5.0 in a coded PHY mode is 1 Mbps. Considering the processing delay and power consumption and other indexes of the physical layer, a working clock of the decoder may be set at 16 MHz. The TBU of the decoder occupies a large power consumption, and the backtracking modes usually include bit-by-bit backtracking and block-by-block backtracking. In bit-by-bit backtracking, one decoded bit is output in each time, while in block-by-block backtracking, multiple output bits are generated in each time. The former will consume more power, but the decoding delay is relatively small, and registered resources required by the SMU are relatively small. Because the working clock of the decoder in this method is 16 times of a rate of decoding the input code stream, and a number of states of the convolutional codes (2,1,4) is only 8, the power consumption is in a more important design index position compared with the decoding delay and the registered resources. Therefore, the block-by-block backtracking mode is employed in this method.

When the block-by-block backtracking is employed, the SMU is divided into B memory blocks, and each memory block is a memory matrix of 8*N. For instance, the SMU is divided into three memory matrices $C^{(i)}$ (i=0, 1, 2) of 8×32. $c_{m,n}^{(i)}$ (m=0, 1, ..., 7, n=0, 1, ..., 31) represents an element in an m-th row and an n-th column of the matrix $C^{(i)}$, which stores coded input bit information corresponding to a survivor-path entering a state m, and this path is remained after ACS operation on all paths entering the state m at the current moment. According to this bit information, a state at the previous moment transferred to the current state may be inferred. These three memory matrices will form a large cyclic memory block. For example, when the matrices $C^{(0)}$ and $C^{(1)}$ are filled in the decoding process, the backtracking is started. At the same time of backtracking, new survivor-path information is written into the matrix $C^{(2)}$. Because 32 is equal to 8 times of a constraint length of the convolutional codes (2,1,4), the path information of all the survivor-paths in the matrix $C^{(0)}$ is usually merged into one path. Therefore, in the backtracking operation, the path with the smallest path metric value is selected from all the survivor-paths for backtracking. When the backtracking enters the matrix $C^{(0)}$ through the matrix $C^{(1)}$, all the bit information obtained from the backtracking in the matrix $C^{(0)}$ may be used as a decipher and output. Compared with an information bit stream at a sending end, the decoded bit information directly obtained by backtracking is actually LIFO. If FIFO is needed, the decoded bit information needs to be stored in a Random Access Memory (RAM) first, and then output according to FIFO rules. It takes about 64 clock cycles to complete a normal backtracking, which is equivalent to 4 symbol cycles. Therefore, after the backtracking is completed, the matrix $C^{(2)}$ has not been filled yet, but the information of the matrix $C^{(0)}$ has been used up, and new new survivor-path information may be stored. When the matrix $C^{(2)}$ is filled, the matrices $C^{(1)}$ and $C^{(2)}$ may be used for the backtracking operation, while the matrix $C^{(0)}$ may be written with new survivor-path information. Follow-up operations are cycled accordingly. Until the last backtracking, the number of decoded remaining bits does not exceed 96. In this case, all the decoded remaining bits are regarded as decoded correct bits and output, so the last backtracking is to directly backtrack all the decoded bits.

It can be seen from the above that the low-power-consumption viterbi decoding implementation method of the Bluetooth receiver relates to four backtracking modes in total, which shows that the design of the backtracking part is very critical and has important influence on power consumption, delay and complexity. Therefore, the present application combines the conditions of Bluetooth 5.0 in terms of rate, packet format and coding characteristics, and proposes a block-by-block backtracking method according to the characteristics of the packet format and the convolutional codes (2,1,4) of Bluetooth 5.0, which can make full use of the registered resources, reduce the power consumption and reduce the time delay.

What is claimed is:

1. A decoding implementation method of a Bluetooth receiver, comprising:
   setting a first length threshold and a second length threshold, wherein a received signal of the Bluetooth receiver comprises a first Forward Error Correction FEC block and a second FEC block, the second FEC block comprises a packet data unit and check data, the packet data unit comprises a packet header, and the first length threshold is a sum of a length of the packet header and a length of the check data;
   storing a survivor-path of the first FEC block in a Survivor-path Memory Unit SMU, decoding and backtracking the first FEC block, and sequentially outputting a coded indicator and an access address of the first FEC block in a First Input First Output FIFO mode;
   determining whether the second FEC block needs despreading according to the coded indicator, if the second FEC block needs despreading, despreading the second FEC block and waiting for decoding the despread second FEC block, and if the second FEC block does not need despreading, waiting for decoding the second FEC block; matching the access address with an actual address, if the access address is successfully matched with the actual address, waiting for decoding the second FEC block, and if the access address is not successfully matched with the actual address, resetting the Bluetooth receiver;
   storing a survivor-path of the second FEC block into the SMU, when a data length stored in the SMU reaches the first length threshold, decoding and backtracking the data stored in the SMU, outputting bit information obtained by decoding and backtracking in a FIFO mode, and taking out a length of a packet payload in the packet header from a time when a time value is the same as the length value of the check data; and
   judging whether a total number of bits of the second FEC block exceeds the second length threshold according to the length of the packet payload, and in response to that the total number of bits of the second FEC block does not exceed the second length threshold, performing one-time backtracking on the second FEC block to complete decoding; and in response to that the total number of bits of the second FEC block exceeds the second length threshold, performing block-by-block decoding and backtracking on the second FEC block first, outputting a decoded stream with a fixed number of bits in each time, and in the case that a number of remaining bits after the block-by-block decoding does not exceed the second length threshold, performing one-time backtracking on the remaining bits to complete decoding.

2. The method according to claim 1, wherein the SMU comprises B memory blocks, B≤3, and the memory block is configured to store survivor-paths.

3. The method according to claim 2, wherein the performing block-by-block decoding and backtracking on the second FEC block first comprises:
   storing the survivor-path of the second FEC block in a first memory block and a second memory block of the SMU, backtracking the second FEC block after memory spaces of the first memory block and the second memory block are both filled, and storing a new survivor-path of the second FEC block in a third memory block of the SMU when backtracking the second FEC block; and
   in the case that the backtracking of the second FEC block enters the first memory block through the second memory block, outputting all bit information obtained in the backtracking of the first memory block as a decipher; after a memory space of the third memory block is filled, setting the second memory block and the third memory block as backtracking the second FEC block, setting the first memory block as storing the new survivor-path of the second FEC block, and circularly performing the following operations: after the memory spaces of the current two memory blocks of the SMU sequentially storing the survivor-path of the second FEC block are both filled, backtracking the second FEC block, storing the new survivor-path of the second FEC block in the remaining one memory block of the SMU, and in the case that the backtracking of the second FEC block enters the previous memory block through the latter memory block of the current two memory blocks storing the survivor-path, outputting all bit information obtained in the backtracking of the previous memory block as a decipher, and after the memory space of the remaining one memory block is filled, setting the latter memory block and the remaining one memory block as backtracking the second FEC block, and setting the previous memory block as storing the new survivor-path of the second FEC block.

4. The method according to claim 2, wherein a storage length of each memory block in the SMU is set as N, a total storage length of the SMU is set as B*N, and the second length threshold is set as the total storage length of the SMU.

5. The method according to claim 3, wherein when performing block-by-block decoding and backtracking on the second FEC block, a decoded result is outputted in a Last Input First Output LIFO mode.

6. The method according to claim 1, wherein the sequentially outputting the coded indicator and the access address of the first FEC block comprises:
storing the survivor-path of the first FEC block into the SMU, when the stored data length of the SMU reaches a coded input bit length a of the first FEC block, decoding and backtracking the first FEC block, outputting the bit information obtained by decoding and backtracking by a FIFO mode, outputting the coded indicator from a backtracking time a2, and outputting the access address from a backtracking time a1+a2, wherein a1 is a length value of the coded indicator and a2 is a length value of a register null indicator comprised in the first FEC block.

7. The method according to claim 1, wherein the taking out the length of the packet payload in the packet header from the time when the time value is the same as the length value of the check data comprises:
storing the survivor-path of the second FEC block into the SMU, when the data length stored in the SMU reaches b1+b2, decoding and backtracking the second FEC block, outputting the bit information obtained by decoding and backtracking in a FIFO mode, taking out a length field of the packet payload in the packet header from a backtracking time b2, and determining the length of the packet payload, wherein b1 is a length value of the packet header, and b2 is a length value of the check data.

8. The method according to claim 7, wherein, when performing one-time backtracking on the second FEC block to complete decoding in response to that the total number of bits of the second FEC block does not exceed the second length threshold, a decoded result is output from a backtracking time b3, wherein b3 is a length value of a register null indicator comprised in the second FEC block.

9. The method according to claim 3, wherein each memory block in the SMU is a memory matrix of 8*N, a total storage length of the SMU is B*N bits, and a width of the SMU is 8 bits.

* * * * *